United States Patent [19]

Leedom

[11] 4,031,546
[45] June 21, 1977

[54] DISC PLAYER AND STYLUS THEREFOR
[75] Inventor: Marvin Allan Leedom, South Brunswick Township, Middlesex County, N.J.
[73] Assignee: RCA Corporation, New York, N.Y.
[22] Filed: June 30, 1975
[21] Appl. No.: 591,953
[30] Foreign Application Priority Data
Nov. 18, 1974  United Kingdom ............ 49926/74
[52] U.S. Cl. .......................... 358/128; 179/100.1 B; 179/100.4 R; 179/100.41 G; 274/38
[51] Int. Cl.² ........................................ H04N 5/76
[58] Field of Search .................. 178/6.6 R, 6.6 DD; 179/100.4 R, 100.4 M, 100.1 B, 100.41 G; 274/38; 358/128

[56] References Cited
UNITED STATES PATENTS
3,930,117   12/1975   Clemens et al. ................ 178/6.6 R Primary Examiner—Raymond F. Cardillo, Jr.
Attorney, Agent, or Firm—Eugene M. Whitacre; William H. Meagher; Wendell K. Fredericks

[57] ABSTRACT

A pickup stylus adapted to track in a disc record groove has a support element with a tip shaped to have a pair of sides, a rear face, and a bottom with edges defining a right triangle of small dimension. The rear face and the sides terminate at the base, altitude and hypotenuse edges of the bottom respectively. Also the tip has a knife edge formed at an intersection of the sides which extends upward from the apex of the triangular shaped bottom remote from the base edge at an angle obtuse to the bottom. When used in a disc record player system, the stylus tip is aligned such that the base edge of the bottom lies transverse to the groove, the hypotenuse edge spans diagonally substantially the entire width of a groove, while the altitude edge faces the center of rotation of the turntable. The direction of rotation of the turntable beneath the point of stylus reception in the groove extends from the apex of the triangular shaped bottom toward the base edge.

7 Claims, 4 Drawing Figures

DISC PLAYER AND STYLUS THEREFOR

The present invention relates to a novel disc record playback system of a form suitable for playback of high density information records such as video discs, and to a novel stylus structure advantageous for use in such playback systems.

In U.S. Pat. No. 3,842,194 issued on Oct. 15, 1974 to Jon K. Clemens, video disc playback systems of a variable capacitance form are disclosed. In one configuration therein disclosed, information, representative of recorded picture and sound, is encoded in a spiral groove of a disc in the form of geometric variations on the bottom of the groove, the surface of which comprises conductive material covered with a thin coating of dielectric substance. The groove bottom geometry variations comprise depressed areas extending across the groove bottom alternate with non-depressed areas, with the frequency of alternation varying with the amplitude of video signals subject to recording. Capacitance variations between a conductive electrode disposed on a tracking stylus and the conductive material of the disc occur as the disc is rotated by a supporting turntable; the capacitance variations are sensed to recover the recorded information.

A stylus structure disclosed in the Clemens patent includes a support member fabricated from a hard material such as sapphire or diamond, having a tip shaped to substantially conform to the record groove and a rear face to support a conductive electrode. The tip of the support member is formed having a pair of sides, a rear face and a bottom with edges defining a shape closely resembling an isoscele triangle of small dimension, i.e., having two sides equal. In operation, the stylus tip is oriented in the record groove such that the apex of the triangular shaped bottom encounters the variations in geometry of the information track of the spiral groove ahead of the rear face containing the electrode as the disc is revolved by the supporting turntable.

Disc records having high groove densities (e.g., 4,000 to 8,000 grooves per inch) are subject to occasional flaws causing unwanted obstructions to clog a groove. In many circumstances a clogged groove will cause a stylus to repetitively track the same groove convolution(s) creating an effect generally referred to as a locked groove condition.

The present invention is concerned with a pickup stylus design which may be employed to lessen the likelihood of an occurrence of a locked groove condition. The stylus includes a support member fabricated from a hard material shaped to taper to a tip at one end, with the tip having an essentially flat face, a first side and a second side and a right triangular shaped bottom. The face, first side and second side terminate at the base, altitude and hypotenuse edges of the bottom respectively. A knife edge, formed by the intersection of the first and second sides, extends away from the apex of the triangular shaped bottom.

As the disc is rotated, the stylus pickup arm will radially track the record groove from the outer perimeter of the disc towards the center.

Pursuant to the principles of the present invention, a stylus of the described shape is oriented in the groove such that the rear face is transverse to the groove walls. The first side is parallel with the inner groove wall while the second side diagonally spans the width of the groove. The direction of rotation of the turntable beneath the point of stylus reception in the groove extends from the apex of the triangular shaped bottom towards the base edge. The direction of rotation of the turntable beneath the point of stylus reception in the groove extends from the apex of the triangular shaped bottom towards the base edge.

The above-described stylus shape and orientation has been found to provide improved player performance with lessened occurrences of locked groove conditions. A theory of operation, explanatory of such results, is that when the stylus encounters groove obstructions that cause dislodgement of the stylus from the groove, the novel stylus bottom shape and knife edge orientation favor inward deflection of the stylus (i.e., movement toward the center of rotation of the disc record) by the obstruction, thereby lessening the likelihood that the stylus dislodgement will result in outward deflection (with consequent repetition of the traversal of the same groove convolution and repeated encounters with the same obstruction).

Objects, features and advantages of the present invention will become more apparent to those skilled in the art upon a reading of the following detailed description and an inspection of the accompanying drawings wherein.

In the figures corresponding elements are designated by like reference numerals.

Figure 1:
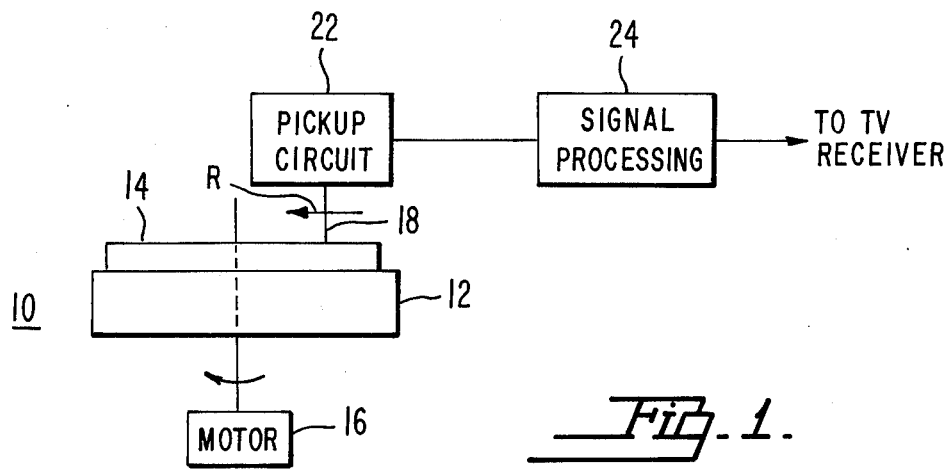
FIG. 1 illustrates a disc playback system in which a playback stylus constructed in accordance with an embodiment of the present invention may be advantageously employed.

Referring to FIG. 1, there is illustrated therein a video disc player system which is illustratively of a variable capacitance form as generally shown in the aforesaid Clemens patent. The player system 10 contains a rotatable disc turntable 12 for supporting the spiral grooved disc record 14 and a motor means 16 for rotating turntable 12. A mechanical support system (not illustrated in FIG. 1) is provided for stylus 18 which enables the stylus to track the successive convolutions of the spiral groove of disc record 14. Illustratively, the support system may (as shown, for example, in the copending application of Byron K. Taylor, et al., Ser. No. 522,822, now U.S. Pat. No. 3,917,903 include a pivoted pickup arm supporting the stylus at its free end, and an enclosure in which said pickup arm is pivotally mounted. To enable the desired groove tracking to be effected with a substantially constant stylus attitude, the enclosure is desirably subject during disc record playback to a radial motion (in the direction shown by arrow R in FIG. 1) suitably synchronized with the rotation of turntable 12.

System 10 also contains a pickup circuit 22 for converting capacitance variations sensed by stylus 18 to an electrical signal which can be processed by a signal processing circuit 24 to a form suitable to be used by a television receiver or monitor.

Figure 2:
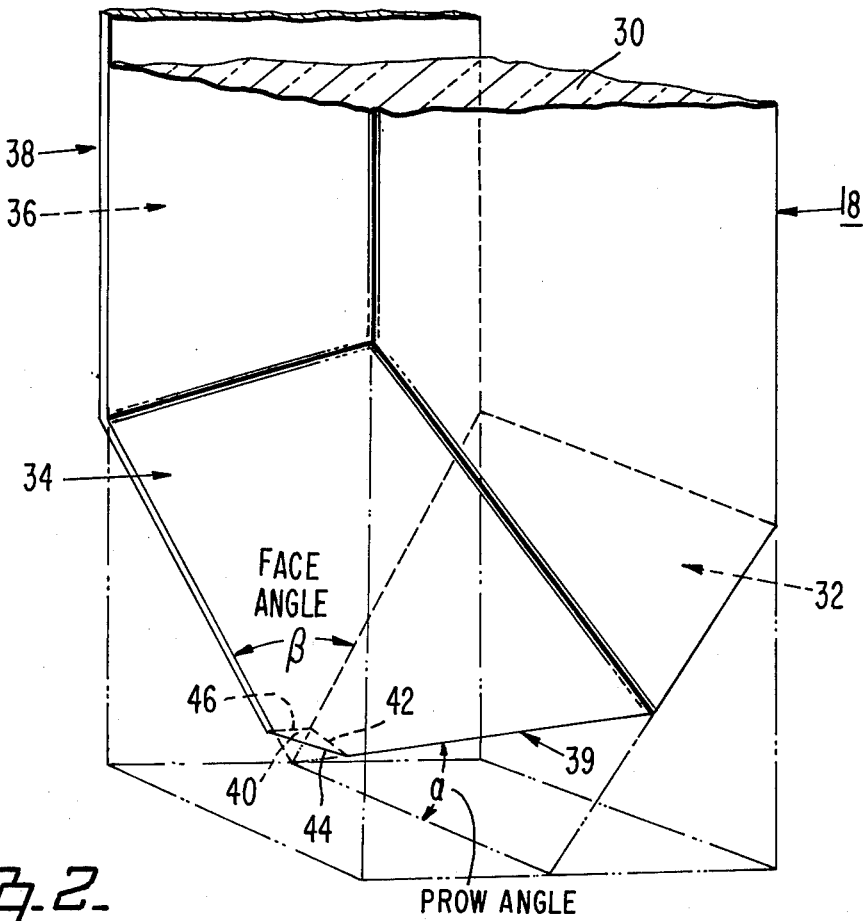
FIG. 2 is an exaggerated perspective drawing of the tip portion of a stylus suitable for use in the arrangement of FIG. 1.

FIG. 2 is an exaggerated perspective drawing of the tracking stylus 18 of FIG. 1 showing the various features of the tip. The stylus 18 includes a dielectric support element 30 which has a tip with a first side 32, a second side 34, a rear face 36, an electrode 38, a knife edge 39 and a right triangular shaped bottom 40.

The first side 32 is mostly rectangular in shape; it projects perpendicular from the rear face 36 at an angle oblique to the longitudinal axis of the support element 30. The first side 32 has one corner terminating at the altitude edge 42 of the right triangular shaped bottom 40.

The second side 34 is generally a parallelogram shaped surface which extends from the rear face 36 in a plane oblique to both the rear face 36 and the longitudinal axis of the support element 30, intersecting the first side 32 in a manner that knife edge 39 results. The second side 34, at one corner, terminates the hypotenuse edge 44 of the right triangular shaped bottom 40.

The rear face 36 has edges of equal length which taper to the base edge 46 of the right triangular shaped bottom 40. It has an electrode 38 disposed thereon for sensing information recorded on record 14 of FIG. 1.

Figure 3:
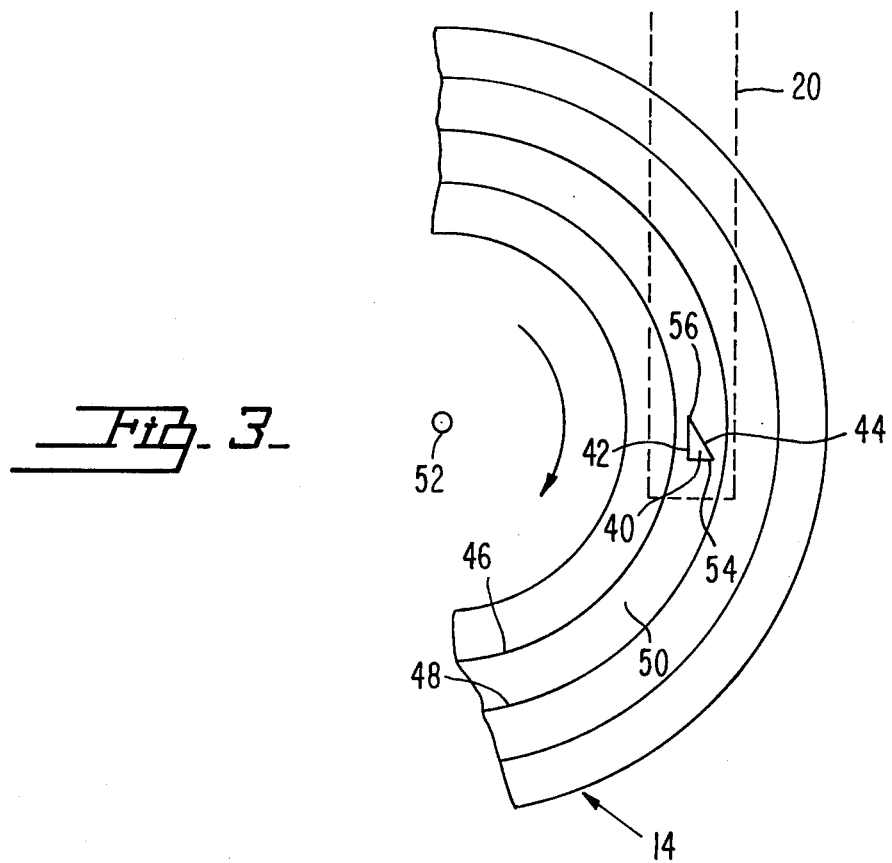
FIG. 3 illustrates an orientation, in a disc record groove, of a tip portion of the stylus of FIG. 2, as desired for disc playback pursuant to the principles of the present invention.

FIG. 3 illustrates an orientation of the bottom 40 of the FIG. 2 stylus which is advantageously employed during playback of the disc record 14. The stylus support system (represented in the drawing by the outline showing of a pickup arm enclosure 20 of the previously described type) locates the stylus tip during playback so that: the altitude edge 42 of bottom 40 lies basically tangential to the inner wall 46 (i.e., the wall closer to disc center 52) of the groove convolution 50 in which the stylus tip is received. In this illustrated orientation, the hypotenuse edge 44 of the bottom 40 spans the groove 50 diagonally from the inner wall 46 to the outer wall 48. The apex 56 of the triangular shaped bottom 40 is aligned in the groove such that the information tracks will pass under it ahead of the base edge 54 when the disc 14 is rotated in the direction shown. As the disc rotation occurs, it is accompanied by radial motion of enclosure 20 toward disc center 52 which permits the illustrated orientation of stylus bottom 40 to be maintained throughout the disc playback.

Figure 4:
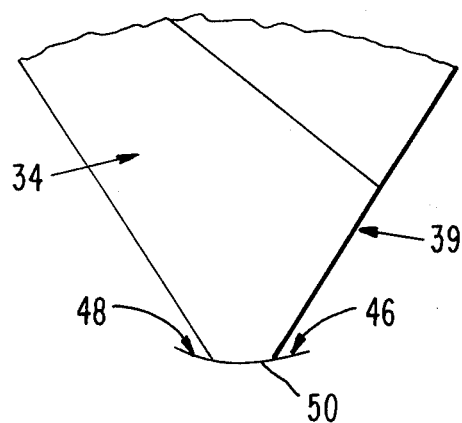
FIG. 4 illustrates a knife edge of the tip of the stylus of FIG. 2 in relationship to a disc record groove surface.

FIG. 4 illustrates a front view of stylus 18 during the traversal of the record groove convolution 50 (also illustrated in FIG. 3). As shown in FIG. 4, the knife edge 39 lies, at its bottom termination, adjacent to the inner wall 46 of groove convolution 50, and rises therefrom along the groove in a direction which is angled inwardly (i.e., toward the disc record center). The rise of knife edge 39 from the bottom 40 occurs at a prow angle $\alpha$ (see FIG. 2), which is illustratively about 20°.

It has been found that when a stylus of the FIG. 2 shape is employed for playback of a disc record, with a stylus orientation as shown in FIGS. 3–4, a lessened number of occurrences of locked groove conditions is likely to be observed (than when a stylus of prior art symmetrical configuraton is employed in playback of said disc record). It is believed that this performance improvement may be explained in the basis that those encounters with groove obstructions that divert the stylus from its proper path produce forces on the asymmetrical stylus in a direction favoring stylus diversion inwardly (i.e., toward the center of the disc record).

An illustrative method for fabricating the stylus 18 of FIG. 2 will be described. A sapphire wafer stock covered on one side by a conductive coating is cut with a diamond saw into approximately 60 by 40 milliinch rectangular shaped chips. A chip thus formed provides the material of both the support element 30 and the electrode 38 for the tracking stylus 18. The coated side of the wafer chip serves as the rear face 36, and conductive coating thereon serves as the electrode 38.

The chip is then mounted on a pencil stick (a means for holding the chip during the lapping stage). The first side 32 of FIG. 2 is lapped in one step (1) at a rake angle (the angle between the rear face and a side) of 90°, and (2) with an orientation angled relative to the longitudinal axis of the chip at one-half the face angle $\beta$ (the included angle of the rear face); illustratively, a face angle of about 60° is desirable between the edges of the rear face 36. The second side 34 is developed in two lapping steps. First, lapping occurs (1) at a rake angle of 90°, and (2) with an orientation complementary to the aforesaid orientation, to establish the desired rear face shape. Then, a second lapping at a rake angle of about 60° is made which causes the second side to intersect the first side, thus forming an oblique knife edge 39 at the intersection. The resulting knife edge 39 is also oblique to the longitudinal axis extending upward from the bottom 40 of the stylus. Illustratively, these lappings are performed on a Lucite drum.

The support element 30 is then removed from the pencil stick and is mounted in a lapping assembly which is similar to a disc player, and the bottom is lapped at an angle equal to that used when the stylus is actually in operation (e.g., approximately 90° to the rear face 36). The finished support element has a tip with a right triangular shaped bottom, with an illustrative set of dimensions comprising a base edge 46 of about 2 microns in length and an altitude edge 42 of about 5 to 8 microns in length.

What is claimed is:

1. In a disc playback system including a turntable for rotating a spiral grooved disc record of the type which contains an information track in the groove thereof, the combination comprising:
   1. an elongated stylus tapering to a tip at one end thereof, said tip having:
      a. a substantially flat rear face, with a pair of edges converging at said one end and terminating at the ends of a base edge of a generally right triangular shaped bottom surface;
      b. a first side disposed orthogonally relative to said rear face and extending from a first edge of said rear face, said first side terminating at said one end at an altitude edge of said triangular shaped bottom surface; a second side disposed at an acute angle to the rear face extending from a second edge of said rear face, said second side terminating at a said one end at a hypotenuse edge of said triangular shaped bottom surface; and
      c. an electrode disposed on said rear face; and
   2. means for mounting said stylus in a manner permitting stylus reception in a record groove during record playback with an orientation of said stylus tip bottom such that said stylus tip side terminating at said altitude edge of said bottom faces the center of rotation of said turntable, and the direction of movement of said turntable beneath the point of stylus reception extends from said apex toward said base edge.

2. Apparatus in accordance with claim 1, wherein said stylus tip has a knife edge formed at an intersection of said second side with said first side in a plane containing said first side and orthogonal to said rear flat face.

3. In a disc playback system including a turntable for rotating a spiral grooved disc record of the type with contains an information track in the groove thereof, the combination comprising:
1. a stylus including an oblong element having a tapering tip at one end thereof, said tip having:
   a. a bottom, said bottom having edges defining generally a right triangular shape;
   b. a knife edge, extending upward from an apex of said triangular shaped bottom of said tip at an angle obtuse to the bottom and lying at an intersection of first and second sides of said tip; and
   c. a substantially flat rear face terminating at a base edge of said right triangular shaped bottom; and
2. means for mounting said stylus in a manner permitting stylus reception in a record groove during record playback with an orientation of said stylus tip such that said knife edge extends from said apex to a point above said groove which lies closer to the axis of rotation of said turntable than said apex does, and the direction of movement of said turntable beneath the point of stylus reception extends from said apex toward said base edge.

4. In a disc playback system including a turntable for rotating a spiral grooved disc record of the type which contains an information track in the groove thereof, the combination comprising:
1. a stylus including:
   a. an oblong support element tapering to a tip at one end thereof, said tip having an essentially flat rear face, a first side, a second side, and a right triangular shaped bottom; said face and sides terminating at base, altitude and hypotenuse edges of said bottom, respectively;
   b. a knife edge, extending upward from an apex of said triangular shaped bottom remote from said base edge at an angle obtuse to the bottom, and lying at an intersection of said first and second sides; and
   c. an electrode disposed on said rear face; and
2. means for mounting said stylus in a manner permitting stylus reception in a record groove during record playback with an orientation of said stylus tip bottom such that said stylus tip side terminating at said altitude edge of said bottom faces the center of rotation of said turntable, and the direction of movement of said turntable beneath the point of stylus reception extends from said apex toward said base edge.

5. A combination in accordance with claim 4, wherein said support element is made of a dielectric material.

6. A combination in accordance with claim 4, wherein said knife edge is positioned during record playback to extend from said apex of said bottom of said tip in the groove of a record subject to playback to a point above said groove which lies closer to the axis of rotation of said turntable than said apex does.

7. In a disc playback system including a turntable for rotating a spiral grooved disc record of the type which contains an information track in the groove thereof, the combination comprising:
1. a stylus including:
   a. an oblong support element tapering to a tip at one end thereof, said tip having an essentially flat rear face, and a pair of converging sides, with one of said converging sides disposed at a first angle with respect to said rear face and with the other of said converging sides disposed at a second angle, smaller than said first angle, with respect to said rear face; said face and sides terminating at respective edges of the bottom of said tip, with the bottom edge at which said one side terminates being shorter in length than the bottom edge at which said other side terminates; and
   b. an electrode disposed on said rear face; and
2. means for mounting said stylus in a manner permitting stylus reception in a record groove during record playback with an orientation of said stylus such that said one side of said support element tip faces the center of rotation of said turntable, and the direction of movement of said turntable beneath the point of stylus reception extends from said support element bottom toward the bottom of said electrode.

* * * * *